(12) United States Patent
Malcus et al.

(10) Patent No.: US 8,685,289 B2
(45) Date of Patent: Apr. 1, 2014

(54) PULVERULENT COMPOUNDS, A PROCESS FOR THE PREPARATION THEREOF AND THE USE THEREOF IN LITHIUM SECONDARY BATTERIES

(75) Inventors: Stefan Malcus, Goslar (DE); Sven Albrecht, Goslar (DE)

(73) Assignee: Toda Kogyo Europe GmbH, Dusseldorf (DE)

( * ) Notice: Subject to any disclaimer, the term of this patent is extended or adjusted under 35 U.S.C. 154(b) by 295 days.

(21) Appl. No.: 12/373,950

(22) PCT Filed: Oct. 11, 2007

(86) PCT No.: PCT/EP2007/008848
§ 371 (c)(1),
(2), (4) Date: Jul. 22, 2009

(87) PCT Pub. No.: WO2008/043558
PCT Pub. Date: Apr. 17, 2008

(65) Prior Publication Data
US 2009/0314985 A1 Dec. 24, 2009

(30) Foreign Application Priority Data
Oct. 13, 2006 (DE) .......................... 10 2006 049 098

(51) Int. Cl.
*H01B 1/02* (2006.01)

(52) U.S. Cl.
USPC ................ 252/518.1; 252/182.1; 252/519.14; 423/594.4; 429/231.1; 429/231.3; 429/231.95; 429/322

(58) Field of Classification Search
USPC ............ 252/182.1, 519.14, 518.1; 423/594.4; 429/231.1, 231.95, 221, 223, 322, 429/231.3
See application file for complete search history.

(56) References Cited

U.S. PATENT DOCUMENTS

| 7,645,542 | B2 * | 1/2010 | Kase et al. ................. | 429/231.1 |
|---|---|---|---|---|
| 2004/0197658 | A1 * | 10/2004 | Kase et al. ................. | 429/231.1 |
| 2005/0220700 | A1 | 10/2005 | Suhara et al. | |
| 2005/0271944 | A1 | 12/2005 | Suhara et al. | |
| 2006/0057466 | A1 | 3/2006 | Suhara et al. | |
| 2006/0210879 | A1 * | 9/2006 | Kawasato et al. ........ | 429/231.95 |
| 2006/0263690 | A1 * | 11/2006 | Suhara et al. .............. | 429/231.3 |

FOREIGN PATENT DOCUMENTS

| EP | 1 450 423 | | 8/2004 | | |
| WO | WO 02-086993 | * | 10/2002 | ............. | C01G 45/00 |
| WO | WO 2004/030125 A1 | * | 4/2004 | ............. | C01G 51/00 |

* cited by examiner

*Primary Examiner* — Khanh Tuan Nguyen
(74) *Attorney, Agent, or Firm* — Nixon & Vanderhye PC

(57) ABSTRACT

The present invention relates to pulverulent compounds of the formula $Li_aNi_bM1_cM2_d(O)_2(SO_4)_x$, a process for preparation thereof and the use thereof as active electrode material in.

14 Claims, 2 Drawing Sheets

PULVERULENT COMPOUNDS, A PROCESS FOR THE PREPARATION THEREOF AND THE USE THEREOF IN LITHIUM SECONDARY BATTERIES

This application is the U.S. national phase of International Application No. PCT/EP2007/008848 filed 11 Oct. 2007 which designated the U.S. and claims priority to German Patent Application No. 10 2006 049 098.3 filed 13 Oct. 2006, the entire contents of each of which are hereby incorporated by reference.

The present invention relates to pulverulent compounds of the formula $Li_aNi_bM1_cM2_d(O)_2(SO_4)_x$, a process for the preparation thereof and the use thereof as active electrode material in lithium secondary batteries.

BACKGROUND OF THE INVENTION

Portable and cordless electric devices are very widely used nowadays. Owing to the continued miniaturization of these portable electronic devices, the demand for increasingly small and increasingly light secondary batteries having a high energy density, which serve as an energy source for such devices, has very rapidly increased in recent years. Secondary batteries used are mainly nickel metal hydride batteries as well as lithium ion batteries. In consumer applications (e.g. mobile phone, laptop, digital camera), virtually exclusively only lithium ion secondary batteries occur since they have a substantially higher energy density compared with the nickel metal hydride batteries.

This type of secondary battery is distinguished by active materials on the cathode and anode side which can reversibly incorporate and release lithium ions. When this battery type was launched in the early 90s, lithium cobalt oxide $LiCoO_2$ was used as the electrochemically active substance for the positive electrode. However, this $LiCoO_2$ which currently still dominates the market for active cathode materials in lithium ion secondary batteries, has a disadvantage of a very high cobalt price and greatly limited availability of cobalt. Against a background of the greatly expanding markets for Li ion technology (i.e. power tools, hybrid engine vehicles (HEV) as new applications), the limited availability of cobalt gives cause for concern that $LiCoO_2$ alone will not be able in future to supply the market for active cathode materials for Li ion batteries. Even at present, more than 25% of the annual cobalt production is used in the battery sector. Alternative cathode active materials are therefore urgently necessary.

Inter alia, against this background, the use of $LiNiO_2$ as active cathode material for Li ion batteries has already been discussed for a relatively long time. Nickel is both substantially more economical than cobalt and available in much larger amounts. In addition, $LiNiO_2$ has a substantially higher electrochemical capacity than $LiCoO_2$.

However, such an $LiNiO_2$ has the disadvantage that, when used in secondary batteries, it leads to insufficient thermal stability of the battery. A significant change in the crystal structure during the charging/discharging process furthermore means that the long-life properties/cycle stability of the batteries with such an active material does not meet the market requirements.

For improving the abovementioned parameters, various doping elements for $LiNiO_2$, such as, for example, Co, Al, Mn, Fe and Mg, were therefore tested over the years, which led to a significant improvement in the parameters discussed above. Example compounds having the dopants mentioned are $LiNi_{0.80}Co_{0.15}Al_{0.05}O_2$ and $LiNi_{0.33}Co_{0.33}Mn_{0.33}O_2$. These dopants permitted the market launch of the nickel-containing lithium mixed metal compounds, which are currently used in addition to the original active material, $LiCoO_2$.

In the case of the required, high-energy density of the storage media (secondary batteries), a distinction may be made between the volumetric energy density, expressed in watt hours/liters (Wh/l), and the gravimetric energy density, expressed in Wh/kg. The volumetric energy density of the secondary battery is influenced, inter alia, by the electrode density ($g/cm^3$) both on the side of the cathode and on the side of the anode. The higher the electrode density of the cathode or anode, the higher is the volumetric energy density of the storage medium. The electrode density in turn is influenced both by the production process of the electrodes and by the active cathode material used. The higher the density of the cathode material (for example, determined as tapped density, compacted density or compressed density), the higher is the resultant electrode density under otherwise constant conditions during electrode manufacture (e.g. processes for electrode manufacture, electrode composition). This discovery is already reflected in some documents.

Thus, DE 19849343 A1 describes the compacted density of lithium-containing mixed oxides of the formula $LiNiCoMO_2$. Here, M is at least one of the metal elements Al, Ca, Mg and/or B. The compacted densities of these materials, the primary particles of which have rectangular or square structure, and the secondary particles of which are spherical, are in the range of 2.4 to 3.2 $g/cm^3$.

In DE 19849343 A1 it is pointed out that the morphology and particle shape of the precursor are of major importance for the shape of the product (the $LiNiCoMO_2$) and hence also the compacted density thereof. Furthermore, it is stated that a higher compacted density increases the relative packing quantity of an active material for a positive electrode, with the result that the capacitance of an electrochemical cell is increased. The importance of spherical particles for achieving high compacted densities is also mentioned.

The relationship between tapped density of the active cathode material and electrode density and hence volumetric energy density of the Li ion battery is described in Journal of The Electrochemical Society, Vol. 15 (2004), 10, pages A1749-A1754.

Since a certain pressure is applied during the electrode preparation, the tapped density or compacted density determined for the powder need not, however, permit direct conclusions about the electrode density when this powder is used. A compressed density of a powder which is determined under a defined pressure represents a variable which permits more reliable conclusions about the electrode density with this powder. A precondition for the abovementioned measurement of the compressed density as well as for the electrode manufacture should be that the particles do not break during the compression. Breaking of the particles would mean firstly uncontrolled manufacture of the electrode and furthermore such comminution of the particles during the electrode production would lead to inhomogeneities. Thus, the internal fracture surfaces of the comminuted particles would not have such good contact with the binder and the conductive additive of the electrode as the external surface of the particles. US 2004/023113 A1 is concerned with the determination of the compressed density and compressive strength of cathode powders.

Substances of the general formula $Li_xM_{(1-y)}N_yO_2$ in which $0.2 \leq x \leq 1.2$, $0 \leq y \leq 0.7$, are mentioned therein. Here, M is a transition metal and N is a transition metal differing from M, or an alkaline earth metal. In US 2004/023113 A1, particular value is placed on the fact that the particle size distribution must have a defined form so that the pressure applied during the compression during electrode manufacture can spread particularly gently over the particle bed. In addition to the particle size distribution, it is also mentioned that the particles of the powder should have pores which are as small as possible and the pore volume of the pores up to a diameter of 1 μm should not exceed a value of 0.03 cm$^3$/g (Hg porosimetry). However, no particular process engineering measures are described for achieving said product parameters. In the determination of the compressed density, the powder is compressed under a pressure of 0.3 t/cm$^2$.

In the examples, mainly lithium cobalt oxides are described. At the abovementioned compression pressure of 0.3 t/cm$^3$, compressed densities in the range of 2.58-3.32 g/cm$^3$ are reached.

In addition to the compressed density itself, value is furthermore placed on the fact that, after the compression of the material, the volume fraction of the particles smaller than 1 μm is not greater than 0.1%. A significant increase in the fine particles after the compression would indicate that particles are destroyed during the application of pressure. Such a phenomenon would endanger the homogeneity of the electrode.

It is however to be assumed that a pressure of 0.3 t/cm$^2$ does not correspond to the pressures which are actually applied during the electrode manufacture. During the electrode manufacture, the material must be built to withstand at least a pressure of 1 t/cm$^2$. In JP 2001-80920 A, a pressure of 2 t/cm$^2$ is stated in example 1 for the electrode manufacture. JP 2001-80920 A mentions the compressive strength of lithium mixed metal oxides (LNCO), which comprise three metallic components in addition to lithium.

The materials thus produced have a compressive strength of 0.001-0.01 N. According to this document, it is desirable for the particles to disintegrate into their primary constituents during the electrode manufacture, which is contrary to the argumentation of US 2004/023113 A1. According to JP 2001-80920 A the material which has disintegrated into smaller constituents must have a certain flowability to enable the particles to be distributed uniformly over the electrode.

The compressive strength of lithium mixed metal oxides is also discussed in US 2005/0220700 A1. There, the compounds have the formula $Li_pNi_xCo_yMn_zM_qO_{2-a}F_a$. Whereas US 2004/023113 A1 only states the value 0.3 t/cm$^2$ for the compressive strength, compressive strengths of at least 50 MPa are stated in US 2005/0220700 A1 for the lithium mixed metal compounds, which corresponds to 0.5 t/cm$^2$. However, the formula for the relevant compounds in US 2005/0220700 A1 is defined substantially more narrowly than that in US 2004/023113 A1. Thus, manganese is a fixed constituent of all compounds in US 2005/0220700 A1.

BRIEF DESCRIPTION OF THE DRAWINGS

The invention is further described with references to the drawings in which.

DETAILED DESCRIPTION OF THE INVENTION

Figure 1:
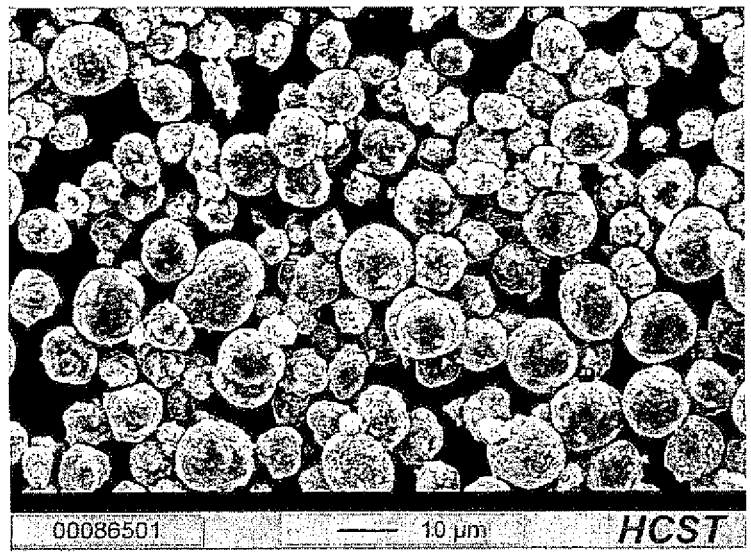
FIG. 1 is an image recorded using a scanning electron microscope related to the product of Example 1.

US 2005/0220700 A1 does not consider why the compounds mentioned have a particular compressive strength. Only a defined particle size range and a defined range for the specific surface area of the materials are mentioned. Particular process engineering peculiarities which make the material particularly pressure-resistant are not mentioned.

US 2005/0220700 A1 discloses compounds which contain fluoride as a further anionic component in addition to the anionic oxygen. EP 1450423 A1 claims an active material for positive electrodes of a nonaqueous secondary battery, which material can be expressed substantially by a lithium mixed metal oxide compound, that has sulphate anions in the range from 0.4% by weight to 2.5% by weight. The high proportion of sulphate anion is intended to ensure that the carbon content in the end product (substantially as alloy to $Li_2CO_3$) is kept low.

It is an object of the present invention to provide a lithium mixed metal oxide in which the secondary particles are not broken or not comminuted during the electrode manufacture (cathode).

The preservation of the secondary particle during electrode manufacture is of major importance for the homogeneity of the electrode. At the same time, it should be possible to achieve a high electrode density and good electrochemical properties with such a lithium mixed metal oxide. The object of the present invention is furthermore to provide a process for the preparation of the lithium mixed metal oxide.

The object is achieved by a pulverulent compound of the formula $Li_aNi_bM1_cM2_d(O)_2(SO_4)_x$ (subsequently also referred to as LNMOS or lithium mixed metal oxides), in which M1 denotes at least one element selected from the group consisting of Fe, Co, Cr, Mg, Zn, Cu and/or mixtures thereof, M2 denotes at least one element selected from the group consisting of Mn, Al, B, Ca, Sr, Ba, Si and/or mixtures thereof, and $0.95 \leq a \leq 1.1$, $0.3 \leq b \leq 0.83$, $0.1 \leq c \leq 0.5$, $0.03 \leq d \leq 0.5$ and $0.001 \leq x \leq 0.03$, the secondary particles of which have a compressive strength of at least 100 MPa.

Compounds which are part of the invention are shown in the table below.

| Compound No. | a | b | M1 | c | M2 | d | x |
|---|---|---|---|---|---|---|---|
| 001 | 1.09 | 0.333 | Co | 0.333 | Mn | 0.333 | 0.015 |
| 002 | 1.05 | 0.50 | Co | 0.20 | Mn | 0.30 | 0.015 |
| 003 | 1.03 | 0.77 | Co | 0.13 | Mn | 0.10 | 0.009 |
| 004 | 1.03 | 0.80 | Co + Mg | 0.10 | Mn | 0.10 | 0.007 |
| 005 | 1.03 | 0.70 | Co | 0.10 | Mn + Al | 0.20 | 0.006 |
| 006 | 1.05 | 0.30 | Co | 0.30 | Mn + Al | 0.40 | 0.015 |
| 007 | 1.03 | 0.80 | Co | 0.17 | Al | 0.03 | 0.005 |
| 008 | 1.04 | 0.75 | Co + Fe | 0.20 | Al | 0.05 | 0.006 |
| 009 | 1.02 | 0.80 | Co | 0.16 | Al + B | 0.04 | 0.003 |
| 010 | 1.03 | 0.80 | Co | 0.17 | Sr | 0.03 | 0.002 |
| 011 | 1.03 | 0.60 | Mg | 0.10 | Mn | 0.30 | 0.004 |
| 012 | 1.04 | 0.45 | Mg | 0.10 | Mn | 0.45 | 0.009 |
| 013 | 1.02 | 0.333 | Co | 0.333 | Mn | 0.333 | 0.015 |
| 014 | 1.04 | 0.45 | Co | 0.10 | Mn | 0.45 | 0.009 |
| 015 | 1.04 | 0.40 | Co + Mg | 0.20 | Mn | 0.40 | 0.007 |
| 016 | 1.02 | 0.77 | Co | 0.20 | B | 0.03 | 0.003 |
| 017 | 1.03 | 0.60 | Co | 0.20 | Mn | 0.20 | 0.005 |
| 018 | 1.03 | 0.80 | Fe | 0.10 | Mn | 0.10 | 0.004 |
| 019 | 1.02 | 0.70 | Co | 0.25 | Al + Ca | 0.05 | 0.002 |
| 020 | 1.01 | 0.80 | Co | 0.16 | Al | 0.04 | 0.001 |

The secondary particles of the pulverulent LNMOS compound according to the invention preferably have a compressive strength of at least 200 MPa, particularly preferably of at least 300 MPa. Secondary particles are understood as meaning compact particles composed of a multiplicity of primary particles. Primary particles are particles which form from nuclei, for example during a crystallization process.

The compressive strength of the secondary particles according to the invention can be determined by the method mentioned in US 2004/0023113 A1, page 6, Example 1.

The pulverulent lithium mixed metal oxides according to the invention are distinguished by their very low porosity. According to the invention, the pulverulent lithium mixed metal oxides have a porosity, measured according to ASTM D 4222, of up to 0.01 cm$^3$/g, preferably up to 0.008 cm$^3$/g, with particular preference up to 0.006 cm$^3$/g.

The pulverulent lithium mixed metal oxide according to the invention can be prepared both in spheroidal and in regular (non-spheroidal) particle shapes.

Preferred pulverulent lithium mixed metal oxides according to the invention are distinguished in particular by the spheroidal particle shape of the secondary particles, the shape factor of which has a value greater than 0.8, with particular preference greater than 0.9.

The shape factor of the secondary particles can be determined by the method mentioned in U.S. Pat. No. 5,476,530, columns 7 and 8 and FIG. 5. This method determines the shape factor of the particles, which is a measure of the sphericity of the particles. The shape factor of the secondary particle can also be determined from the scanning electron micrographs of the materials.

The shape factor is determined by evaluating the particle circumference and the particle area and determining the diameter derived from the respective variables. Said diameters are obtained from $$d_U = U/\pi \quad d_A = (4A/\pi)^{1/2}.$$

The shape factor of the particles f is derived from the particle circumference U and the particle area A according to:

$$f = \left(\frac{d_A}{d_U}\right)^2 = \left(\frac{4\pi A}{U^2}\right)$$

In the case of an ideal spherical particle, $d_A$ and $d_U$ are of equal magnitude, and a shape factor of exactly one would result.

FIG. 1 shows, by way of example, an image, recorded using a scanning electron microscope (SEM), of the pulverulent lithium mixed metal oxide according to the invention, which was prepared according to Example 1.

Preferably, the pulverulent lithium mixed metal oxides according to the invention have a D10 value, measured according to ASTM B 822, which changes by not more than 1 μM, preferably by not more than 0.5 μM, after compression of the powder at a pressure of 200 MPa compared with the starting powder.

A decrease in the D10 value after the compression means that a fraction of the particles has been broken into smaller particles. Thus, the change in the D10 value is a quantitative measure for determining the compressive strength of the powders according to the invention.

Preferably, the pulverulent lithium mixed metal oxides according to the invention have a D90 value, measured according to ASTM B 822, which changes by not more than 1 μm after compression of the powder at a pressure of 200 MPa compared with the starting material.

Figure 2:
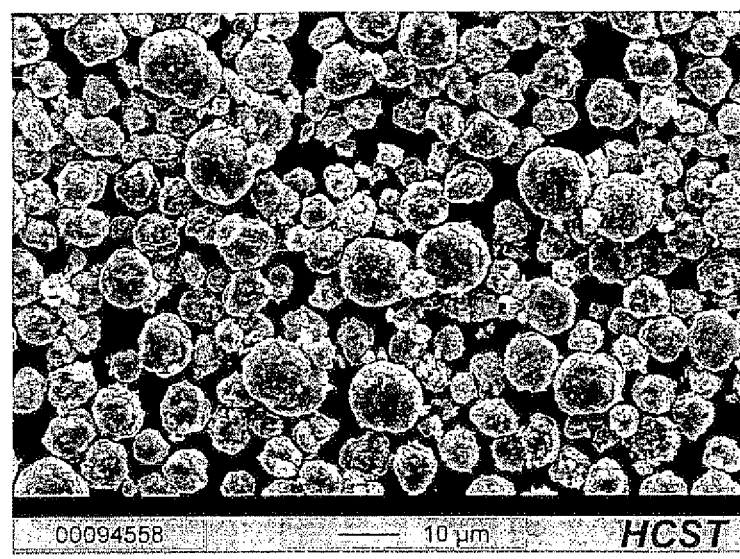
FIG. 2 is an image recorded using a scanning electron microscope related to the product of Example 2.

FIG. 2 shows, by way of example, a scanning electron micrograph of the pulverulent lithium mixed metal oxide according to the invention after compression at 200 MPa, which lithium mixed metal oxide was prepared according to Example 1.

Figure 3:
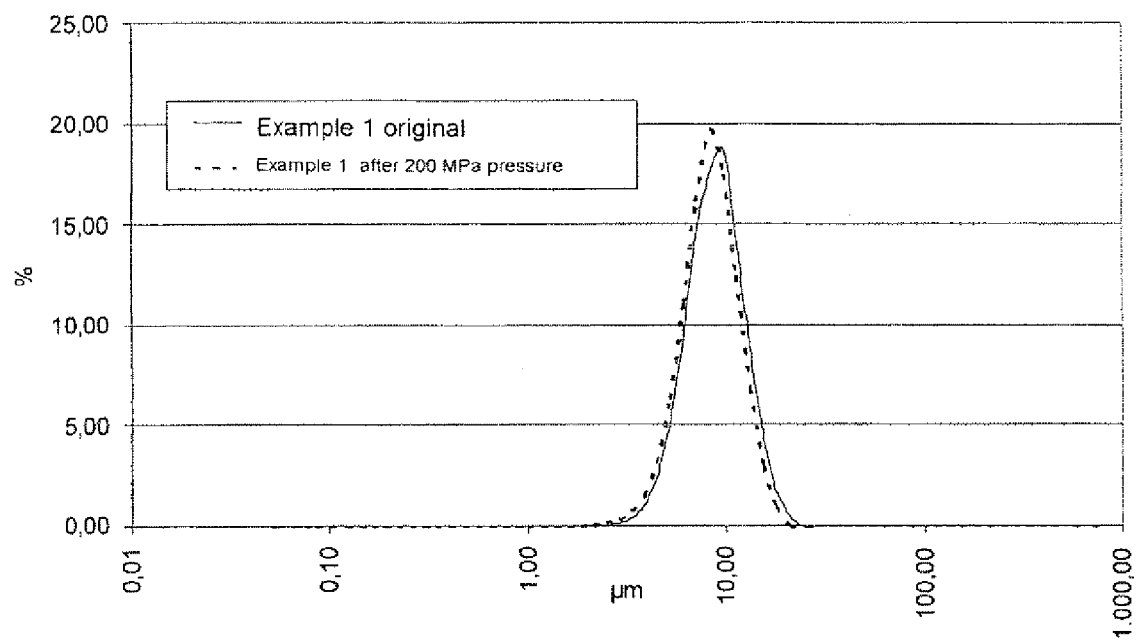
FIG. 3 is a graph showing that the spheroidal secondary particles have retained their shape even after compression and have not broken into fragments of a spheroidal particle.

FIG. 3 shows that the spheroidal secondary particles have retained their shape even after compression and have not broken into fragments of a spheroidal particle and showing the compound prepared according to Example 1 withstands a pressure of 200 MPa without the particles breaking.

The pulverulent lithium mixed metal oxides according to the invention preferably have a normalized width of the particle size distribution, measured according to the Formula (1)

$$\frac{D90 - D10}{D50} \qquad (1)$$

in which D denotes the diameter of the secondary particles, of less than 1.4, particularly preferably less than 1.2.

Preferably, the pulverulent lithium mixed metal oxides according to the invention have a compressed density of at least 3.2 g/cm$^3$, preferably of at least 3.5 g/cm$^3$, measured at a compression pressure of 200 MPa.

The pulverulent lithium mixed metal oxides according to the invention are also distinguished in that they have a tapped density of at least 2.2 g/cm$^3$, preferably of at least 2.4 g/cm$^3$, measured according to ASTM B527.

The invention furthermore relates to a novel process for the preparation of pulverulent lithium mixed metal oxides according to the invention.

The invention therefore relates to a process for the preparation of the pulverulent lithium mixed metal oxides, comprising the following steps:

a. provision of a co-precipitated nickel-containing precursor having a porosity of less than 0.05 cm$^3$/g, measured according to ASTM D 4222, b. mixing the precursor according to a) with a lithium-containing component and production of a precursor mixture, c. calcination of the precursor mixture with multistage heating to temperatures of 1000° C. with the use of a $CO_2$-free (≤0.5 ppm of $CO_2$), oxygen-containing carrier gas and production of a pulverulent product, d. deagglomeration of the powder by means of ultrasound and sieving of the deagglomerated powder.

For the preparation of lithium mixed metal oxides according to the invention, nickel-containing precursors which have a low porosity of less than 0.05 cm$^3$/g, preferably of less than 0.04 cm$^3$/g, particularly preferably of less than 0.03 cm$^3$/g, are required. Suitable nickel-containing precursors are in particular mixed oxides, mixed hydroxides, mixed oxyhydroxides, partially oxidized mixed hydroxides, partially oxidized mixed hydroxysulphates of the metals Ni, Co, Mn, Al, Fe, Cr, Mg, Zr, B, Zn, Cu, Ca, Sr, Ba and/or mixtures thereof.

The preparation of the co-precipitated nickel-containing precursor is carried out by precipitation from aqueous metal salt solutions at a PH of 8-14, preferably of 9-13, by feeding alkali metal hydroxide solutions and optionally ammonia, in gaseous form or as an aqueous solution. Although the reaction to give the nickel-containing precursor can be effected batchwise or semicontinuously, this precipitation reaction is preferably carried out continuously. In the continuous process, metal salt solution and the alkali metal hydroxide solution are fed simultaneously to a precipitation reactor with continuous removal of the product suspension. Suitable metal salts are water-soluble metal salts, e.g. nitrates, sulphates, halides, such as for example, chlorides or fluorides. When carrying out the precipitation, hydroxides of the alkali metals, preferably sodium hydroxide or potassium hydroxide, are used as alkali metal salt solutions.

The nickel-containing precursors can be prepared both in spheroidal and in nonspheroidal particle shape, the preparation of the first-mentioned being carried out in the presence of ammonia or ammonium salts.

For the preparation of the lithium mixed metal oxides, the co-precipitated nickel-containing precursors are thoroughly mixed with a lithium-containing component so that a homogeneous mixture of the components is produced. Lithium carbonate, lithium hydroxide, lithium oxide, lithium nitrate, lithium hydroxide monohydrate and/or mixtures thereof are preferably used as the lithium-containing components. For the reaction of the precursor mixture to give the lithium mixed metal oxides according to the invention it is important for the thermal treatment (calcination) to be effected over a plurality of temperature stages. Preferably, the calcination is carried out in three stages, the precursor mixture being heated at a temperature of 200-400° C. for 2-10 hours in the first stage, at 500-700° C. for 2-10 hours in the second stage and at 700-1000° C. for 2-20 hours in the third stage. Preferably, the precursor mixture is calcined at a temperature of 250-350° C. for 2-10 hours in the first stage, at 550-650° C. for 2-10 hours in the second stage, and at 725-975° C. for 2-20 hours in the third stage, particularly preferably at a temperature of 250-350° C. for 4-8 hours in the first stage, at 550-650° C. for 4-8 hours in the second stage and at 725-975° C. for 5-15 hours in the third stage.

As a result of the temperature hold stages and associated controlled reaction a material is obtained which has no secondary particle agglomerates that are strongly sintered together. Agglomerates that are strongly sintered together are understood as meaning agglomerates which do not disintegrate into the individual secondary particles in the case of ultrasound sieving. Such a material without agglomerates which are strongly sintered together has the advantage that milling, as is usually required after calcination, can be dispensed with. Milling has the disadvantage that destruction of individual spheroidal secondary particles leads to the formation of angular and square-edged particles. It is in particular these particles which, during electrode manufacture, owing to their shape, result in further particles being destroyed within the material bed under high pressure.

The lithium mixed metal oxide which is obtainable after the calcination according to the invention and may be present in slightly agglomerated form is subjected to gentle deagglomeration by means of ultrasound and subsequent sieving. The ultrasound causes the isolated, loose agglomerates which are optionally formed during the calcination, to disintegrate in a gentle manner into their constituents (secondary particles), but without the secondary particles themselves being destroyed.

Furthermore, it is important that the reaction to give the LNMOS takes place in an oxygen-containing carrier gas atmosphere which is free of $CO_2$. A $CO_2$-free carrier gas atmosphere is understood as meaning a carrier gas which contains ≤0.5 ppm (part per million) of $CO_2$. The absence of $CO_2$ in the carrier gas prevents incorporation of the $CO_2$ into the end product, with the result that formation of crystal lattice defects is reduced.

Preferably, the carrier gas contains 20 to 100% by volume, particularly preferably 40 to 100% by volume, of oxygen. The process according to the invention is distinguished by the fact that the reaction of the nickel-containing precursor takes place with retention of the shape of the secondary particles and/or particle size distribution.

The process according to the invention makes it possible, for example, to convert the spherical nickel-containing precursors having a very narrow particle size distribution into the lithium mixed metal oxide with retention of the shape of the secondary particles.

The pulverulent lithium mixed metal oxides according to the invention are suitable in particular for the production of secondary lithium batteries. Preferably, they are used as electrode material (anode, cathode) for lithium secondary batteries together with the material known to the person skilled in the art.

The invention is explained in more detail below with reference to the following example.

Example 1

A spheroidal $Ni_{0.33}Co_{0.33}Mn_{0.33}(O)_{0.2}(OH)_{1.8}(SO_4)_{0.01}$ was used as co-precipitate Ni precursor. This material had a porosity of 0.0372 cm$^3$/g. An $Li_2CO_3$ of <40 μm (Chemetall) was dry-blended with the Ni precursor in the molar Li/(Ni+Co+Mn) ratio of 1.05:1.00. The dry blend thus formed (also referred to as premix) was then placed in an oven at room temperature and first heated to 300° C. and kept at this temperature for 6 hours. The heating of the material and the entire oven process were effected with the use of oxygen as a carrier gas stream which is substantially free of $CO_2$ (≤0.5 ppm). At said 300° C., controlled release of water from the nickel-containing precursor took place.

After this temperature hold stage, the material was heated further to 600° C. and kept at this temperature for 6 hours. At this oven temperature a very controlled reaction of the two starting components to give $Li_{1.04}Ni_{0.33}Co_{0.33}Mn_{0.33}O_2(SO_4)_{0.01}$ took place. The reaction temperature was deliberately kept low in order to be able to achieve a slow and hence controlled reaction of the two components to give the end product. By means of this controlled reaction, the formation of crystal lattice defects and the significant inclusion of pores in the particle structure were avoided. A "breathing"/gas expulsion from the material during the reaction is permitted. Finally, the material is heated to 860° C. and then kept at this temperature for 10 hours in order to carry out ripening of the crystals and to produce high crystallinity.

Thereafter the material is brought to room temperature and then poured directly on to a sieve having a mesh size of 50 μm. The sieve was additionally equipped with an ultrasound generator having an ultrasound power of 200 W. The deagglomerated and sieved material thus obtained has a tapped density of 2.2 g/cm$^3$. The porosity of the material was 0.0029 cm$^3$/g. The D10, D50 and D90 values were 5.67 μm, 8.96 μm and 13.62 μm. For the normalized particle size width, the value of (13.62 μm−5.67 μm)/8.96 μm=0.89 was obtained therefrom.

The material had a density of 3.0 g/cm$^3$ after the determination of the compressed density at 100 MPa, and a density of 3.3 g/cm$^3$ after the determination at 200 MPa.

The D10 value had decreased by 0.2 μm compared with the original material after determination of the compressed density at a pressure of 100 MPa, and the D10 value had decreased by 0.4 μm compared with the original material at a pressure of 200 MPa. The particle size distributions of the material before the compression and after the compression at a pressure of 200 MPa are shown in FIG. 3.

The LNMOS prepared in the example was measured as positive active material in an electrochemical half-cell with lithium metal as the negative electrode (anode). The electrolyte used was a 1:1:1 mixture of ethylene carbonate, dimethyl carbonate and diethyl carbonate, which contained $LiPF_6$ in a concentration of 1 mol/l. The positive electrode consists of 83% by weight of active material, 10% by weight of carbon black super P and 7% by weight of polytetrafluoroethylene (PTFE) as binder. The initial electrochemical capacity was determined in a voltage range of 2.75 to 4.3 V at a constant current rate of 0.1 C (10 hours per complete charging or discharging). Under said measuring conditions an initial discharge capacity of 160 mAh/g was achieved.

The electrochemical cyclic behaviour was determined in a voltage range of 2.75 to 4.3 V at a constant current rate of 1 C (1 hour per complete charging or discharging). After 40 electrochemical charging and discharging cycles, the cell still exhibited 98.5% of the initial discharge capacity at a constant current rate of 1 C.

The invention claimed is:

1. A pulverulent compound of the formula $Li_aNi_bM1_cM2_d(O)_2(SO_4)_x$, in which M1 denotes at least one element selected from the group consisting of Fe, Co, Cr, Mg, Zn, Cu and/or mixtures thereof, M2 denotes at least one element selected from the group consisting of Mn, Al, B, Ca, Sr, Ba, Si and/or mixtures thereof, and $0.95 \leq a \leq 1.1$, $0.3 \leq b \leq 0.83$, $0.1 \leq c \leq 0.5$, $0.03 \leq d \leq 0.5$ and $0.001 \leq x \leq 0.03$, wherein secondary particles composed of a multiplicity of primary particles of the pulverulent compound have a compressive strength of at least 100 MPa and the secondary particles have a normalized width of the particle size distribution, measured according to the Formula (1)

$$\frac{D90 - D10}{D50} \quad (1)$$

in which D denotes the diameter of the secondary particles, is not more than 0.89;

wherein the pulverulent compound is prepared by thoroughly mixing a co-precipitated nickel-containing precursor with a lithium-containing component to form a homogeneous mixture, and heating the mixture in a plurality of temperature stages.

2. The pulverulent compound according to claim 1, wherein the secondary articles have a compressive strength of at least 200 MPa.

3. The pulverulent compound according to claim 1, wherein the secondary particles have a compressive strength of at least 300 MPa.

4. The pulverulent compound according to claim 1, wherein the secondary particles have a porosity of up to 0.01 cm$^3$/g measured according to ASTM D 4222.

5. The pulverulent compound according to claim 1, wherein the secondary particles have a porosity of up to 0.008 cm$^3$/g measured according to ASTM D 4222.

6. The pulverulent compound according to claim 1, wherein the secondary particles have a porosity of up to 0.006 cm$^3$/g measured according to ASTM D 4222.

7. The pulverulent compound according to claim 1, wherein the secondary particles have a spheroidal shape.

8. The pulverulent compound according to claim 7, wherein the secondary particles have a shape factor greater than 0.8.

9. The pulverulent compound according to claim 7, wherein the secondary particles have a shape factor greater than 0.9.

10. The pulverulent compound according to claim 1, wherein the secondary particles have a D10 value, measured according to ASTM B 822, after compression of the material at a pressure of 200 MPa changes by not more than 0.5 μm compared with the starting material.

11. The pulverulent compound according to claim 1, wherein the secondary particles have a D90 value, measured according to ASTM B 822, after compression of the material at a pressure of 200 MPa changes by not more than 1 μm compared with the starting material.

12. The pulverulent compound according to claim 1, wherein the secondary particles have a compressed density of at least 3.2 g/cm$^3$ at a compression pressure of 200 MPa.

13. The pulverulent compound according to claim 1, wherein the secondary particles have a tapped density measured according to ASTM B 527, of at least 2.2 g/cm$^3$.

14. The pulverulent compound according to claim 1, wherein the secondary particles have a tapped density measured according to ASTM B 527, of at least 2.4 g/cm$^3$.

* * * * *